United States Patent
Clark et al.

(10) Patent No.: US 7,254,611 B1
(45) Date of Patent: Aug. 7, 2007

(54) MULTI-HUB CONNECTIVITY IN A SYSTEM FOR COLLABORATIVE PLANNING

(75) Inventors: Gregory Scott Clark, Hillsborough, CA (US); Aynur Ünal, Palo Alto, CA (US); Michael Meehan, Palo Alto, PA (US)

(73) Assignee: E2 Open, Inc., Redwood City, CA (US)

( * ) Notice: Subject to any disclaimer, the term of this patent is extended or adjusted under 35 U.S.C. 154(b) by 832 days.

(21) Appl. No.: 10/132,072

(22) Filed: Apr. 24, 2002

Related U.S. Application Data

(60) Provisional application No. 60/286,216, filed on Apr. 24, 2001.

(51) Int. Cl.
- G06Q 99/00 (2006.01)
- G06F 15/16 (2006.01)
- G06Q 10/00 (2006.01)

(52) U.S. Cl. .................... 709/204; 709/205; 705/1
(58) Field of Classification Search ............... 709/205, 709/223, 204; 705/8, 11, 1, 28
See application file for complete search history.

(56) References Cited

U.S. PATENT DOCUMENTS

| | | | |
|---|---|---|---|
| 5,497,317 A | | 3/1996 | Hawkins et al. |
| 5,960,404 A | * | 9/1999 | Chaar et al. .................... 705/8 |
| 6,119,149 A | * | 9/2000 | Notani .......................... 709/205 |
| 6,314,468 B1 | * | 11/2001 | Murphy et al. .............. 709/236 |
| 6,980,983 B2 | * | 12/2005 | Banerjee et al. ................ 707/3 |
| 2002/0010741 A1 | * | 1/2002 | Stewart et al. .............. 709/204 |
| 2002/0032640 A1 | | 3/2002 | LaFore et al. |
| 2002/0099598 A1 | * | 7/2002 | Eicher et al. .................. 705/11 |
| 2003/0018701 A1 | * | 1/2003 | Kaestle et al. .............. 709/201 |

FOREIGN PATENT DOCUMENTS

| | | |
|---|---|---|
| WO | WO 99/27477 A1 | 6/1999 |
| WO | WO 00/52619 A1 | 9/2000 |
| WO | WO 02/01473 A1 | 1/2002 |

OTHER PUBLICATIONS

DESCARTES.COM. "Inventory Demand Matcher", Descartes Products. Sep. 16, 2002.

* cited by examiner

*Primary Examiner*—Glenton B. Burgess
*Assistant Examiner*—Philip J. Chea
(74) *Attorney, Agent, or Firm*—Swernofsky Law Group PC

(57) ABSTRACT

Adaptable multi-hub connectivity in a system for collaborative planning. Collaborative planning partners communicate using a set of local hubs. Each local hub is disposed for receiving and sending collaborative planning messages, caching and modifying collaborative planning data, and coordinating with one or more regional authorities regarding access to data. The local hubs communicate with client devices, other local hubs, and regional authorities. Regional authorities control access to collaborative planning data, thus controlling who owns that data, who is allowed to modify that data, and who is allowed to read or cache that data. Regional authorities partition the collaborative planning data, each one thus having a distinct subset of that data for which that particular regional authority has the final say. Regional authorities coordinate so that each one can obtain instructions for data not belonging to that particular regional authority.

8 Claims, 3 Drawing Sheets

MULTI-HUB CONNECTIVITY IN A SYSTEM FOR COLLABORATIVE PLANNING

This application claims the benefit of U.S. Provisional Application No. 60/286,216 filed Apr. 24, 2001 hereby incorporated by reference. This document also includes a Technical Appendix, hereby incorporated by reference.

BACKGROUND OF THE INVENTION

1. Field of the Invention

This invention relates to multi-hub connectivity in a system of collaborative planning.

2. Related Art

Supply chain management systems frequently require many different levels of connectivity. For example, suppliers must be able to communicate with manufacturers, manufacturers with suppliers, buyers with sellers, sellers with buyers, and so forth. In many instances, these connections require the synchronization of information and management of exceptions so as to provide information that will be relevant to a particular transaction.

A first problem associated with processing information in a system for supply chain management arises when trading partners and collaborators use different standards when placing orders or creating lists of anticipated needs. These standards may refer to a number of products (for example, 12 gross, 12 dozen or 144) or to a characteristic of the product (for example, 120 millifarads or 0.12 farads). The lack of a specific set of standards makes it difficult or impossible to negotiate electronically if the parties use different standards.

A second problem associated with processing information in a system for supply chain management arises when trading partners and collaborators create demand lists of products or services they desire using different supply chain management tools such as those provided by Manugistics, i2 and others. It is difficult to evaluate information on a demand list, especially with respect to other demand lists, if the lists were created with different tools.

A third problem associated with processing information in a system for supply chain management arises when different entities that share a common supplier have distinctly different processes with respect to placing orders or soliciting bids. It is difficult to take advantage of economies of scale when various entities use different business processes to conduct business with a common supplier.

A fourth problem involves scalability and recovery from errors. The hub and spoke model is not readily scalable. In addition to this problem, a system that relies upon a single centralized hub is vulnerable to loss of business if the hub become temporarily unavailable. Failure is problematic when there is only a single, centralized hub.

SUMMARY OF THE INVENTION

The invention provides a method and system for adaptable multi-hub connectivity in a system for collaborative planning. Collaborative planning partners (such as for example buyers, sellers, and negotiators), communicate with the system using a set of local hubs. Each local hub is disposed for receiving and sending collaborative planning messages, for caching and modifying collaborative planning data, and for coordinating with one or more regional authorities regarding access to collaborative planning data. The local hubs communicate with client devices (used by collaborative planning partners), other local hubs, and regional authorities. Regional authorities control access to collaborative planning data, thus directing local hubs who owns that data, who is allowed to modify that data, and who is allowed to read or cache that data. Regional authorities partition the set of all collaborative planning data maintained by the system, each particular regional authority thus having a distinct subset of that data for which that particular regional authority has the final say. Regional authorities coordinate with each other so that each particular regional authority can obtain instructions for data not belonging to that particular regional authority.

Each regional authority has the final say for data owned by collaborative planners in a logical region, possibly coinciding with a geographical region (such as for example Taiwan, Western Canada, or Hawaii). The number and positioning of regional authorities is established either (1) by the regional authorities themselves, in peer to peer cooperation, or (2) by a global eye having knowledge of system activity. In preferred embodiments, the number and positioning of regional authorities is intended to be optimized for both elements of local control (such as for example distributed computing capability, failover capability, and lower communication latency) and for elements of clear cooperation (such as for example ease of identifying the appropriate regional authority, and simplicity of synchronization). In preferred embodiments, the number and positioning of regional authorities is responsive to one or more factors known to the system and related to collaborative planning (such as for example a number of data elements active or expected to be active in a particular region, a number of modifications to data elements being performed or expected to be performed in a particular region, or a partition of the system into a set of geographic or quasi-geographic regions). As described herein, data elements are "expected to be" active or "expected to be" modified in response to known business methods used by all or some collaborative planners, known schedules of particular collaborative planners, or known business methods used by particular collaborative planners (or particular pairs or groups of collaborative planners).

For example, in one example embodiment, a first collaborative planner is located in (the mythical town of) Yksfonrews, while a second collaborative planner is located in (the mythical town of) Chelm. In the example, the first and second collaborative planners have a particular business process in which the first makes materials purchases on Mondays, the second makes commitments on Wednesdays (for delivery at later times), and the first approves those commitments on Fridays. In the example, the global eye, having knowledge of the particular business process, allocates a token for a regional authority to the local hub in Yksfonrews on Mondays, thus concentrating data synchronization in that location on those days when it is best used there, moves the token for the regional authority to the local hub in Chelm on Wednesdays, and moves the token for the regional authority back to the local hub in Yksfonrews on Fridays. In an extension of this example, the first collaborative planner might have offices in a set of locations Y1, Y2, Y3, and the like, while the second collaborative planner might have offices in a set of locations Ch1, Ch2, Ch3, and the like. In this extended example, the global eye, in response to this knowledge, moves a set of tokens for regional authorities to Y1, Y2, Y3, on Mondays and Fridays, and moves them back to Ch1, Ch2, Ch3, on Wednesdays.

In an aspect of the invention, each local hub includes an interface capable of receiving messages in a first collaborative planning protocol (such as for example RosettaNet, or for example from a product such as those offered by i2 or Manugistics). The interface may include one or more of: a software element disposed relatively local to the client device, an element disposed relatively local to the local hub, a software element disposed at a third location (such as for example at an intermediate device or at an ASP); the software element is capable of receiving messages in the first collaborative planning protocol and generating messages in a common collaborative planning protocol used by local hubs for communication among themselves. Thus, a client device only capable of communication in the first collaborative planning protocol can interact with a local hub and thus interact with the entire system. Similarly, each local hub includes an interface capable of sending messages in a second collaborative planning protocol (which may or may not be the same as the first collaborative planning protocol). The interface includes a software element capable of receiving messages in the common collaborative planning protocol and sending messages in the second collaborative planning protocol. Thus, a client device only capable of communication in the second collaborative planning protocol can interact with a local hub and thus interact with the entire system. Moreover, two separate client devices, a first only capable of communication in the first collaborative planning protocol and a second only capable of communication in the second collaborative planning protocol can interact with each other by means of one or more intermediate local hubs.

In an aspect of the invention, selected ones of the local hubs may be designated as private, that is, restricted to only selected types of traffic. In preferred embodiments, these selected types of traffic might be responsive to one or more of (1) the nature of the client device or the user employing that client device, such as for example a private local hub for the use of specified users or companies; (2) the nature of the data sought to be modified using that local hub, such as for example a private local hub for interacting with data from the second collaborative planner from Chelm noted above; (3) the nature of the markets sought to be accessed using that local hub, such as for example a private local hub for participating only in Dutch auctions; (4) the nature of the products sought to be accessed using that local hub, such as for example a private local hub for buying or selling only DRAM memories. Each regional authority might access or control only local hubs that are private, only local hubs that are public, or local hubs of either type. Moreover, each regional authority might direct particular local hubs to begin restricting their activities (thus becoming private), cease restricting their activities (thus becoming public), or change the restrictions on their activities (thus changing from a first to a second type of private local hub). In an example embodiment, a regional authority having knowledge of specific business processes between the first collaborative planner from Yksfonrews noted above and the second collaborative planner from Chelm noted above, might direct particular local hubs to change their status between private and public in response to aspects of that business process. For example, if a business process exception is noted between the first and the second collaborative planner, the regional authority might direct a particular local hub to restrict its activity to only those actions related to correcting or dealing with the exception.

In an aspect of the invention, an individual collaborative planner is associated, for each particular product associated with that collaborative planner, with a set of strategic suppliers and a set of first-tier suppliers, a set of second-tier suppliers, and so on. For each part of the particular product, the collaborative planner might obtain that part from its strategic suppliers or first-tier suppliers, that is, from those suppliers with whom the collaborative planner directly does business. Each of the first-tier suppliers provides that part to the collaborative planner, and in turn obtains sub-parts for that part from its own first-tier suppliers, which are therefore second-tier suppliers for the original collaborative planner. In preferred embodiments, the collaborative planner obtains each particular part from more than one such first-tier supplier; for example a buyer of DRAM memories might obtain 80% of its typical needs from the supplier in Yksfonrews and 20% of its typical needs from the supplier in Chelm. If an atypical circumstance occurs, such as for example the supplier in Yksfonrews is unable to supply that part, the collaborative planner might obtain all of its atypical needs from the supplier in Chelm. The nature of any particular supplier as a first-tier supplier, second-tier supplier, or the like, is responsive to both the selected individual collaborative planner and to the particular product, and might also be responsive to other market factors, such as the aggregate need for that product, the market pricing for that product, seasonality, or other factors.

In an aspect of the invention, selected local hubs might be capable of aggregating collaborative planning information from a plurality of collaborative planners, and of treating aggregated information in a unified manner. For example, where individual demand from a particular company is generated and transmitted to the system using more than one set of collaborative planning software (such as for example software from i2 or Manugistics), the local hub to which that demand is presented might be capable of aggregating that demand and presenting that demand from that particular company as if it were generated as a unified collaborative planning demand. The unified collaborative planning demand might be directed to a selected counter-party, or might be distributed among a plurality of counter-parties, as described above with regard to strategic suppliers and first-tier suppliers. Similarly, for example, where a particular company commits to supply parts from more than one subunit of the company, the local hub to which that commitment is presented might be capable of aggregating that commitment and presenting that commitment from that particular company as if it were a unified collaborative planning commitment.

INCORPORATED DISCLOSURES

Inventions described herein can be used in conjunction with inventions described in the following applications:

application Ser. No. 09/823,888, filed Mar. 30, 2001, in the name of inventor Gregory Clark, titled Private Collaborative Planning in a Many to Many Hub, application Ser. No. 10/087,444, filed Mar. 1, 2002, in the name of inventor Erik Stuart, titled "On-Line Auction with Different Rules Applicable to Different Phases", application Ser. No. 09/967,905, filed Sep. 28, 2001, in the name of inventor Gregory Clark, titled "Method for Business to Business Collaborative Viral Adoption", application Ser. No. 09/967,907, filed Sep. 28, 2001, in the name of inventor Gregory Clark, titled "Securing Information in a Design Collaboration and Trading Partner Enviroment", in the name of inventor Gregory Clark.

These applications are hereby incorporated by reference as if fully set forth herein. They are collectively referred to as the "incorporated disclosures".

System Elements

Figure 1:
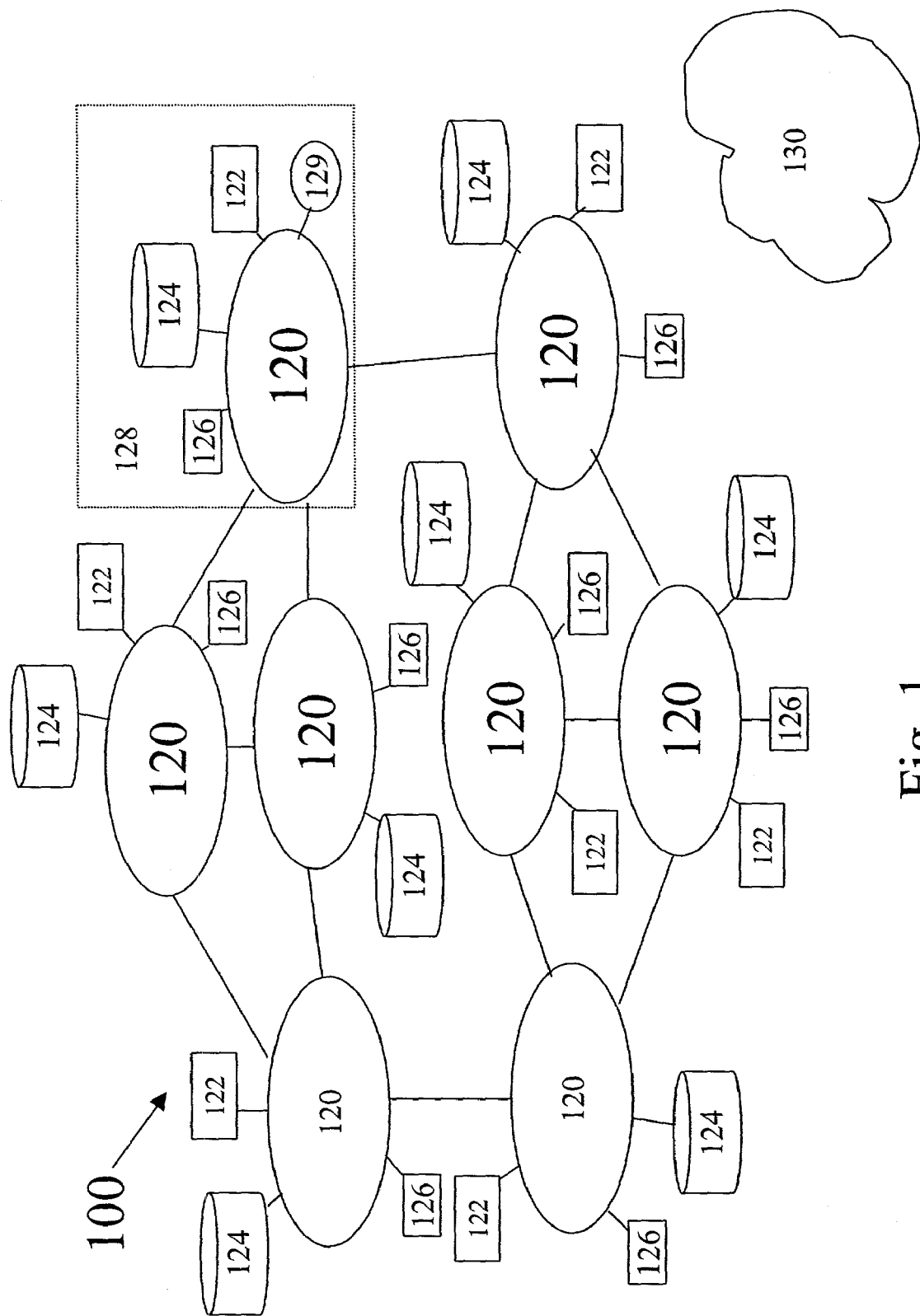
FIG. 1 shows a block diagram of a high level view of a system of collaborative planning and supply chain management including a plurality of local hubs.

FIG. 1 shows a block diagram of a system of collaborative planning including a plurality of hubs.

A system 100 includes a plurality of local hubs 120 and a communication network 130. These local hubs 120 are geographically distributed in locations in the world where clients are likely to be located. For example, the system 100 may include a first local hub 120 in Tokyo, a second local hub 120 in Bangalore, and a third local hub 120 in London. Each local hub 120 can be coupled so as to share information with other local hubs 120.

Each local hub 120 in the plurality of local hubs 120 also includes a server 122, a database 124 and software 126.

All databases 124 in the system 100 include the same information. Each database 124 is periodically updated with respect to every other database 124 in a process known as synchronization. Each portion of each database 124 has an identifiable owner. The owner of any particular portion of a database 124 is generally a client of the local hub 120 who also has rights to modify the data in that portion. Generally, this is limited to buyers and sellers. However, in other embodiments, ownership of data is determined in response to who has a right to the goods or money described by the information in the database 124.

In a preferred embodiment, control of the data in a local hub 120 is vested in a regional authority 128. The regional authority 128 has control of all of the data owned by the entities in a particular region of the world. The regional authority 128 preferably includes a local hub 120, but in other embodiments, may include a specialized device that is distinct in function from a local hub 120. In a first example, a local hub 120 in Kuala Lumpur may be designated as the regional authority 128 for all the local hubs 120 in southeast Asia. In a second example, a local hub 120 in San Jose, Calif. may be designed as the regional authority 128 for local hubs 120 in northern California.

The regional authority 128 maintains data consistency by controlling who may write to the data in at least one database 124 (or portion of a database 124), and by controlling who may perform any other activity that changes the state of the information in the database 124. Since the regional authority 128 does not allow multiple parties to write to the same information at the same time, the information can be maintained globally consistent.

A local hub 120 is designated as a regional authority 128 in response to an amount of business activity in its (geographic or other) region of the world. At various times, this may reflect the number of local hubs 120 in a particular region, dates and time of doing business, behavior in various parts of a supply chain or other factors. In one embodiment, the amount of business activity is measured by looking to the number of transactions that are occurring. In other embodiments, the amount of business activity is measured by other metrics, such as a monetary value of the trade, the number of units being traded or some other variable for measuring business activity.

When the designation of the regional authority 128 is responsive to the amount of business activity, a different regional authority 128 might be designated if the level of business activity drops off. Possession of a logical token 129 indicates what device (that is, which local hub 120) is the regional authority 128 at that time. This token 129 is exchanged between an outgoing regional authority 128 and an incoming regional authority 128. This token 129 may include a set of computer program code, a set of access privileges, or other similar indicator of authority.

The plurality of local hubs 120 are also used to implement a failover configuration among the local hubs 120. For example, if a local hub 120 in Los Angeles fails because of a local disaster (or due to overuse, or any other reason), clients can be transparently redirected to a different local hub in San Francisco. Redirection might be performed by a software element in a client device, by a software element in a redirecting router associated with the local hub 120, or otherwise. Thus, there is no break in service or loss of data, due to synchronization to reflect activity at the local hubs 120.

The communication network 130 is disposed for communicating data between (1) client devices under the control of trading partners and the local hubs 120, and (2) among different local hubs 120. In a preferred embodiment, the communication network 130 includes a packet switched network such as the Internet, as well as (in conjunction with or instead of) an intranet, an enterprise network, an extranet, a virtual private network, a virtual switched network, or in one preferred embodiment in conjunction with a set of dedicated communication links. In alternative embodiments, the communication network 130 may include any other set of communication links that couple the system for collaborative planning 110 with trading partners and collaborators.

Example System

Figure 2:
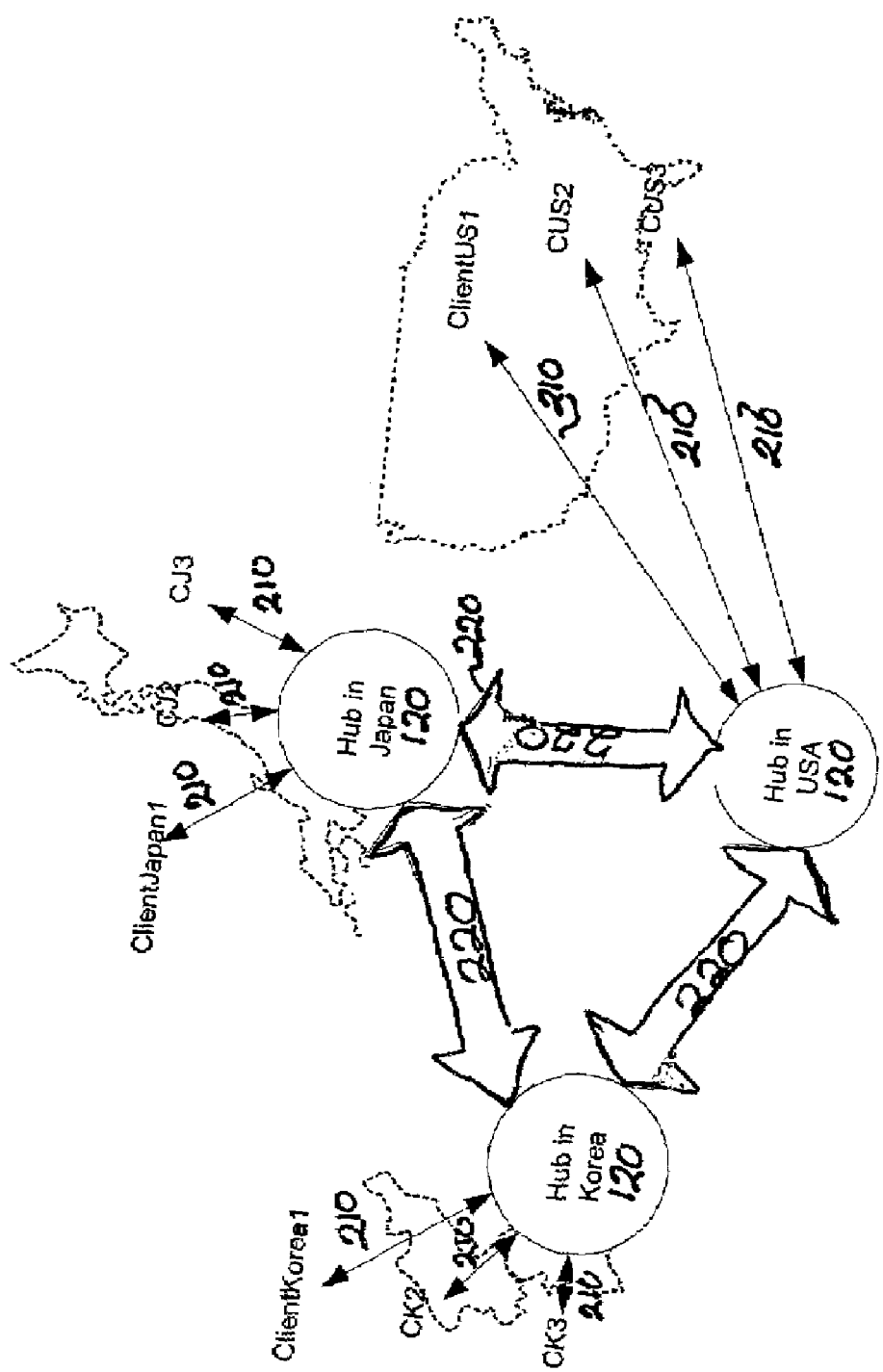
FIG. 2 shows an example of a system of collaborative planning and supply chain management including a plurality of local hubs.
Figure 3:
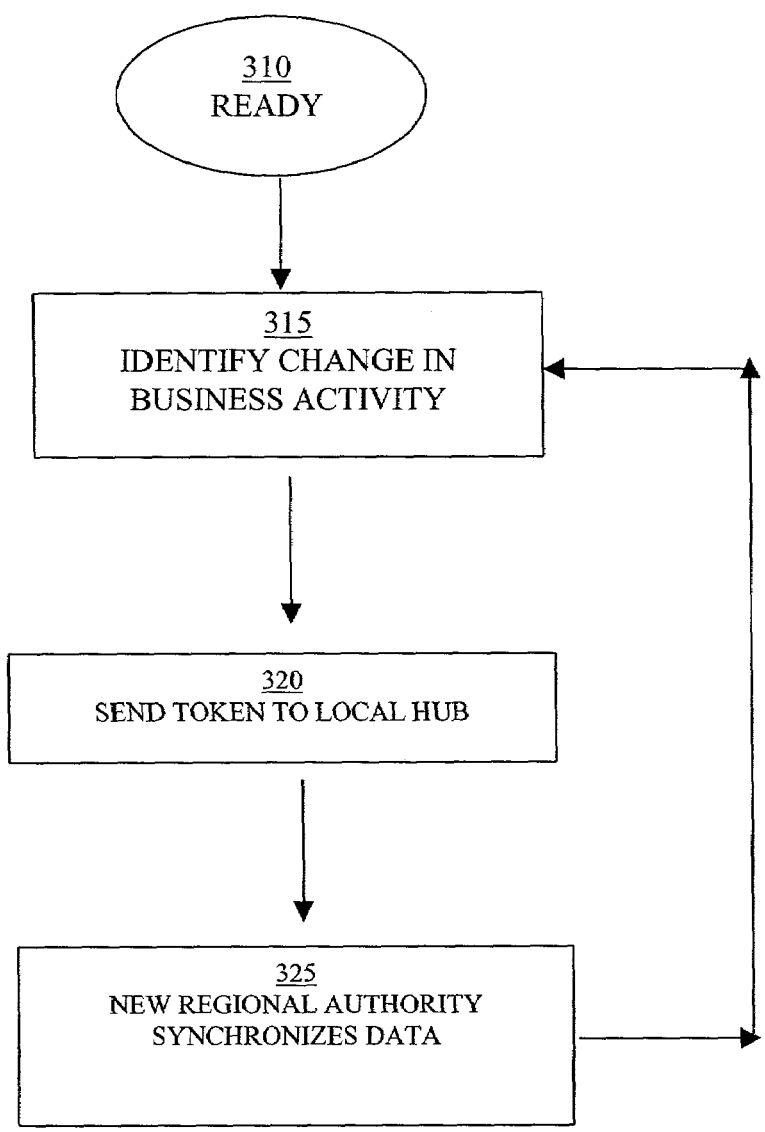
FIG. 3 shows a method of synchronizing information in a system of collaborative planning and supply chain management that includes a plurality of local hubs.

FIG. 2 shows an example of a system of collaborative planning and supply chain management including a plurality of hubs.

A system 200 includes a set of local hubs 120, a first set of information flows 210 between the local hubs 120 and clients, a second set of information flows 220 between the local hubs 120 and each other, and a regional authority 128.

The set of local hubs 120 includes a local hub 120 in Korea, a local hub 120 in Japan, and a local hub 120 in the United States.

The first set of information flows 210 includes data that is exchanged between the local hubs 120 and clients that are geographically situated so as to be relatively close to that particular local hub 120. For example, as shown in FIG. 2, a first set of information flows 210 includes information that is shared between clients in the United States and the local hub 120 in the United State. Another first set of information flows 210 includes information that is shared between clients in Japan and the local hub 120 in Japan. Still another first set of information flows 210 includes information that is shared between clients in Korea and the local hub 120 in Korea.

The second set of information flows 220 includes data that is exchanged between the local hubs 120 and each other. As shown in FIG. 2, information flow 220 includes information that is shared between the local hub 120 in Japan and the local hub 120 in the United States and the local hub 120 in Korea. This second set of information flows 220 includes information that is shared between the local hub 120 in the United States and the local hub 120 in Japan and the local hub 120 in Korea. Similarly, the local hub 120 in Korea includes information that is shared between the local hub 120 in the United States and the local hub 120 in Japan.

The designated regional authority 128 in the system 200 is the local hub in Japan. However, since the regional authority 128 is designated on the basis of local business activity, the local hub 120 in the United States or the local hub 120 in Korea could alternatively be designated as the regional authority 128, or could in addition be designated as an additional regional authority 128 (in which case the regional authorities 128 would partition their authority so that no local hub 120 is subject to more than one regional authority 128).

A failover configuration can be implemented among the local hubs 120. For example, if a first local hub 120 in Japan fails because of a local disaster, Japanese clients can be transparently redirected to a second local hub 120 in Korea. There is no break in service or loss of data; all local hubs 120 have been synchronized to reflect local activity at each local hub 120.

Method of Operation

A method 300 includes a set of flow points and process steps as described herein.

The method 300 is performed by the system 100. Although the method 200 is described serially, the steps of the method 300 can be performed by separate elements in conjunction or parallel, whether asynchronously, in a pipelined manner, or otherwise. There is no particular requirement that the method 300 be performed in the same order in which this description lists the steps, except where so indicated.

At a flow point 310, the system 100 is ready to begin performing a method 300. At the outset, a first local hub 120 is designated as the regional authority 128 for a plurality of other local hubs 120. The regional authority possesses a token 129. The token 129 allows the regional authority 128 to control who may write to a database 124.

At a step 315, a pattern of business activity within the system 100 changes so that peak business activity is no longer occurring in a region relatively proximate to the first local hub 120. This shift in activity is detected by at least one local hub 120, or by the regional authority 128, when information is synchronized. A second local hub 120 corresponding to the peak business activity is identified.

At a step 320, a token 129 is sent from the regional authority 128 to the local hub 120 that is most proximate (geographically or otherwise, preferably geographically with respect to location weighted by communication topology) to the location of peak business activity. The local hub 120 that receives the token becomes the new regional authority 128. The former regional authority 128 no longer has the authority to synchronize data among the other local hubs 120, and becomes an ordinary local hub 120.

At a flow point 325, the new regional authority 128 is ready to synchronize data on behalf of the system 100. Steps 315 and 320 are repeated whenever there is a significant shift in business activity or in any other parameter such as may be used to identify the regional authority 128.

ALTERNATIVE EMBODIMENTS

Although preferred embodiments are disclosed herein, many variations are possible which remain within the concept, scope and spirit of the invention; these variations would be clear to those skilled in the art after perusal of this application.

The invention claimed is:

1. A system for electronic supply chain management and collaborative planning, including
   - a plurality of hubs, wherein each hub in said plurality includes a set of information owned by business entities relatively proximate to each hub;
   - at least one hub in said plurality of hubs designated as a regional authority;
   - a token possessed by said regional authority identifying said regional authority as a regional authority and including access privileges that authorize said regional authority to synchronize said set of information stored at other hubs, wherein at least read and write access of said other hubs to said set of information is controlled by said regional authority; and
   - a measure of business activity identified at one of said other hubs wherein said measure identifies peak business activity causing said token to be transferred to one of said other hubs proximate to said peak business activity making the hub a regional authority;
   - wherein said peak business activity is measured by at least one of the following: (1) number of transactions, (2) number of units being traded, and (3) monetary value of transactions.

2. A system as in claim 1, wherein said information regards an electronic transaction performed by said hub or a business entity that conducts business using said hub.

3. A method for synchronizing data among a plurality of hubs including steps of
   - receiving a notification that a peak in business activity is occurring at a first hub;
   - transferring a token to said first hub, wherein said token is associated with access privileges for authority to synchronize information from a second hub and wherein said information is owned by business entities that are relatively proximate to said second hub;
   - receiving said token at said first hub; and
   - synchronizing information from said second hub;
   - wherein said peak business activity is measured by at least one of the following: (1) number of transactions, (2) number of units being traded, and (3) monetary value of transactions.

4. A method for supply chain management and collaborative planning, including
   - defining a plurality of hubs, wherein each hub in said plurality includes a set of information owned by business entities relatively proximate to each hub;
   - designating at least one hub in said plurality of hubs as a regional authority;
   - associating a token with said at least one hub responsive to said designating;
   - authorizing said regional authority responsive to access privileges associated with said token to synchronize said set of information stored at other hubs, wherein at least read and write access of said other hubs to said set of information is controlled by said regional authority; and
   - receiving a notification of peak business activity at one of said other hubs causing said token to be transferred to said one of said other hubs that is most proximate to said peak business activity designating the hub as a regional authority;

wherein said peak business activity is measured by at least one of the following: (1) number of transactions, (2) number of units being traded, and (3) monetary value of transactions.

5. A method as in claim 4, wherein said information regards an electronic transaction performed by said hub or a business entity that conducts business using said hub.

6. An apparatus for synchronizing data among a plurality of hubs, including
- means for receiving a notification that a peak in business activity is occurring at a first hub;
- means for transferring a token to said first hub, wherein said token is associated with access privileges for authority to synchronize information from a second hub and wherein said information is owned by business entities that are relatively proximate to said second hub;
- means for receiving said token at said first hub; and
- means for synchronizing information from said second hub;
- wherein said peak business activity is measured by at least one of the following: (1) number of transactions, (2) number of units being traded, and (3) monetary value of transactions.

7. A method for supply chain management and collaborative planning, including
- defining a plurality of hubs, wherein each hub in said plurality includes a set of information owned by business entities associated with each hub;
- designating a first hub in said plurality of hubs as a regional authority wherein said designating includes a token associated with access privileges for said regional authority;
- controlling read and write access by said plurality of hubs to said set of information at said regional authority;
- receiving a notification of peak business activity occurring at a second hub; and
- transferring said token to said second hub whereby said second hub is designated as a regional authority;
- wherein said peak business activity is measured by at least one of the following: (1) number of transactions, (2) number of units being traded, and (3) monetary value of transactions.

8. A method of claim 7, wherein a first regional authority for a first set of hubs is queried by a second regional authority for information about how the second regional authority can obtain information controlled by the first regional authority.

\* \* \* \* \*